United States Patent [19]

Baker

[11] 4,298,984
[45] Nov. 3, 1981

[54] METHOD AND APPARATUS FOR IMPROVING ERROR RATE ON RADIO TELETYPE CIRCUITS

[75] Inventor: Charles L. Baker, Richardson, Tex.

[73] Assignee: Her Majesty the Queen in right of Canada, as represented by the Minister of National Defence, Canada

[21] Appl. No.: 729,084

[22] Filed: Oct. 6, 1976

[51] Int. Cl.³ ............................................. H04B 7/06
[52] U.S. Cl. .................................... 375/40; 375/100; 455/52
[58] Field of Search ................... 325/60, 30, 154, 163, 325/38 A, 44, 47, 56, 59, 40–42; 375/40, 48, 100; 455/52

[56] References Cited

U.S. PATENT DOCUMENTS

| | | | |
|---|---|---|---|
| 2,548,814 | 4/1951 | Peterson | 325/163 |
| 3,195,048 | 7/1965 | Adams et al. | 325/154 |
| 3,354,433 | 11/1967 | Minc | 375/40 |
| 3,412,206 | 11/1968 | Bizet et al. | 325/163 |
| 3,508,154 | 4/1970 | Kermode | 325/60 |
| 3,560,856 | 2/1971 | Kaneko | 325/38 A |
| 3,697,874 | 10/1972 | Kaneko | 325/38 A |
| 4,001,692 | 1/1977 | Fenwick et al. | 325/60 |

Primary Examiner—Howard A. Birmiel
Attorney, Agent, or Firm—William R. Hinds

[57] ABSTRACT

Existing single channel radio teletype circuits employing single frequency shift, i.e. mark/space, are prone to interference from static, impulse type noise, and selective fading. The present invention provides time diversity which improves the error rates of such circuits. A stream of binary coded data is divided into first and second identical data streams. The data in the second stream is delayed by a predetermined number of frames. Subsequently, a comparison of the data in the two streams is made and one-of-four digital signals are produced dependent on the results of the comparison. The one-of-four signals are used to produce corresponding audio tones which are transmitted. At the receiving end, the audio tones are used to produce one-of-four voltages which are processed to produce third and fourth data streams corresponding to the first data stream and the delayed second stream. The third data stream is delayed by the same amount as the second data stream was delayed during transmissions, bringing the third and fourth data streams into correspondence. The better of the two data streams is then selected for use.

8 Claims, 2 Drawing Figures

METHOD AND APPARATUS FOR IMPROVING ERROR RATE ON RADIO TELETYPE CIRCUITS

BACKGROUND OF THE INVENTION

This invention relates to a method and apparatus for time diversity transmission and reception of binary coded data.

Existing single channel radio teletype circuits employing single frequency shift, i.e. mark/space, are prone to interference from static, impulse type noise, and selective fading. The present invention reduces the error rates due to these problems by providing time diversity.

SUMMARY OF THE INVENTION

In accordance with the present invention, binary coded data to be transmitted is divided into first and second identical data streams. The data in the second data stream is delayed by a predetermined number of frames. Subsequently, a comparison is made of the data in the first and second data streams and one-of-four digital signals are produced dependent on the comparison. The one-of-four signals are used to produce corresponding audio tones which are then transmitted on a suitable carrier.

During transmission, the audio tones are received and one-of-four voltages are derived corresponding to the received tones. From the one-of-four voltages, third and fourth data streams are produced corresponding to the first data stream and to the delayed second data stream respectively. The third data stream is then delayed by the same number of frames that the second data stream was delayed during transmission, thus bringing the third and fourth data streams into time correspondence. The better of the third and fourth data streams is then selected for use.

DESCRIPTION OF THE PREFERRED EMBODIMENT

Figure 1:
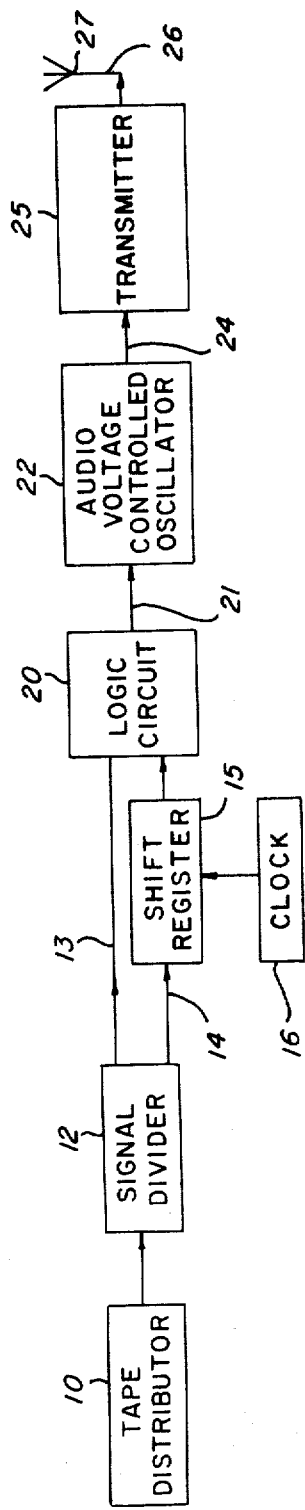
FIG. 1 is a block diagram of a transmitting system in accordance with the invention.

Referring to FIG. 1, there is shown a tape distributor 10 from which data to be transmitted is derived. Of course, the data may be derived from any conventional teletype code generator such as transmit/receive perforators, keyboard machines, etc., in any code format.

The input signal from tape distributor 10 is fed to a signal divider 12 which divides the input signal into two identical data streams on lines 13 and 14. The signal divider 12 is simply a power divider, e.g. a resistive dividing network. The data in the second data stream on line 14 is delayed by a predetermined number of frames, as by a shift register 15 controlled by a source of clock pulses 16. Subsequently, in logic circuit 20, a comparison is made of the data in the first and second data streams and one-of-four digital signals are produced on line 21 dependent on said comparison. The one-of-four digital signals comprise four distinct voltage levels corresponding to the comparison as follows:

level 1: data "0" in both streams.
level 2: data "1" in both streams.
level 3: data "1" and "0" in the first and second streams, respectively.
level 4: data "0" and "1" in first and second streams respectively.

The one-of-four digital signals on line 21 from logic circuit 20 control the output frequency on line 24 from audio voltage controlled oscillator 22. The audio tone on line 24 then modulates a transmitter 25 in the same manner as a conventional tone keyer. It should be noted that any parity or redundancy code information could be included at the D.C. signal level prior to processing.

The output of transmitter 25 feeds an antenna 27 over a line 26.

Figure 2:
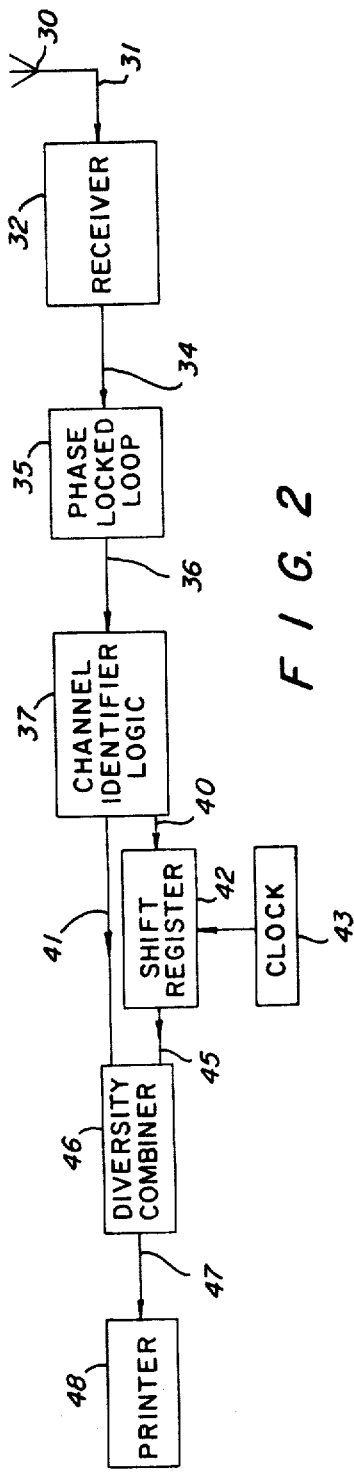
FIG. 2 is a block diagram of a receiving system in accordance with the invention.

Referring to FIG. 2, the signal transmitted from antenna 27 is picked up by a receiving antenna 30 and fed over a line 31 to a receiver 32. The receiver produces an audio output tone over line 34 which is connected to a phase locked loop circuit 35. Fluctuation in the received tone frequency will then produce a correction voltage for a voltage controlled oscillator in the phase locked loop 35 which is a function of the received tone frequency. This correction voltage is fed over line 36 to channel identifier logic 37 to produce third and fourth data streams on lines 40 and 41, corresponding to the first data stream and the delayed second data stream from the transmitter. The third data stream over line 40 is fed to a shift register 42 controlled by a clock 43 and shift register 42 delays the third data stream by the same number of frames as the second data stream was delayed during transmission. The output of the shift register 42 on line 45 is thus brought back into time correspondence with the data stream on line 41. Lines 41 and 45 feed a diversity combiner 46 which selects the better of the two data streams as by parity checking, signal/noise ratio, or A.G.C. gating referred back to the radio receiver. Thus the better of the two data streams is fed from the diversity combiner 46 over a line 47 to a point of use, such as a printer 48.

The signals on lines 41 and 45 could alternatively be combined.

The phase locked loop 35 may comprise a National Semiconductor LM 565 or LM 565 C. These are general purpose integrated circuit phase locked loops containing a stable, highly linear voltage controlled oscillator.

The clocks 16 and 43 should, of course, be closely matched, i.e. have the same rate. The normal 50 or 60 Hz A.C. supply is used for synchronization of teletype signals.

I claim:

1. A time diversity method of transmitting binary coded data comprising dividing said data into first and second identical data streams, delaying the data in said second data stream by a predetermined number of frames, subsequently making a comparison of the data in said first and second data streams and producing one-of-four digital signals dependent on said comparison, using said one-of-four signals to produce corresponding audio tones, and transmitting a carrier modulated by said audio tones.

2. A method as claimed in claim 1 wherein said one-of-four digital signals comprise four distinct voltage levels corresponding to said comparison as follows:

level 1: data "0" in both streams
level 2: data "1" in both streams
level 3: data "1" and "0" in first and second streams, respectively level 4: data "0" and "1" in first and second streams, respectively.

3. A method of decoding data transmitted in accordance with the method of claim 1 comprising receiving said audio tones, deriving one-of-four voltages corresponding to the received tones, producing from said one-of-four voltages third and fourth data streams corresponding to said first data stream and to the delayed second data stream respectively, delaying said third data stream by the same number of frames that said second data stream was delayed during transmission, and selecting for use the better of said fourth data stream and said delayed third data stream.

4. Time diversity apparatus for transmitting binary coded data comprising means for dividing said data into first and second identical data streams, means for delaying the data in said second data stream by a predetermined number of frames, means for subsequently making a comparison of the data in said first and second data streams and producing one-of-four digital signals dependent on said comparison, means responsive to said one-of-four signals to produce corresponding autio tones, and means for transmitting a carrier modulated by said audio tones.

5. Apparatus as claimed in claim 4 wherein said one-of-four digital signals comprise four distinct voltage levels corresponding to said comparison as follows:
    level 1: data "0" in both streams
    level 2: data "1" in both streams
    level 3: data "1" and "0" in first and second streams, respectively
    level 4: data "0" and "1" in first and second streams, respectively.

6. Apparatus as claimed in claim 5 wherein said means for delaying the data in the second stream comprises a shift register controlled by a source of clock pulses.

7. Apparatus for decoding data transmitted by apparatus in accordance with claim 4 comprising means for receiving said audio tones, means for deriving one-of-four voltages corresponding to the received tones, means for producing from said one-of-four voltages third and fourth data streams corresponding to said first data stream and to the delayed second data stream respectively, means for delaying said third data stream by the same number of frames that said second data stream was delayed during transmission, and means for selecting for use the better of said fourth data stream and said delayed third data stream.

8. Apparatus as claimed in claim 7 wherein said means for delaying said third data stream comprises a shift register controlled by a source of clock pulses.

* * * * *